Oct. 7, 1958   D. D. ZEBLEY   2,855,090
CABLE LINKED TRAVELLING CONVEYORS
Filed May 25, 1953
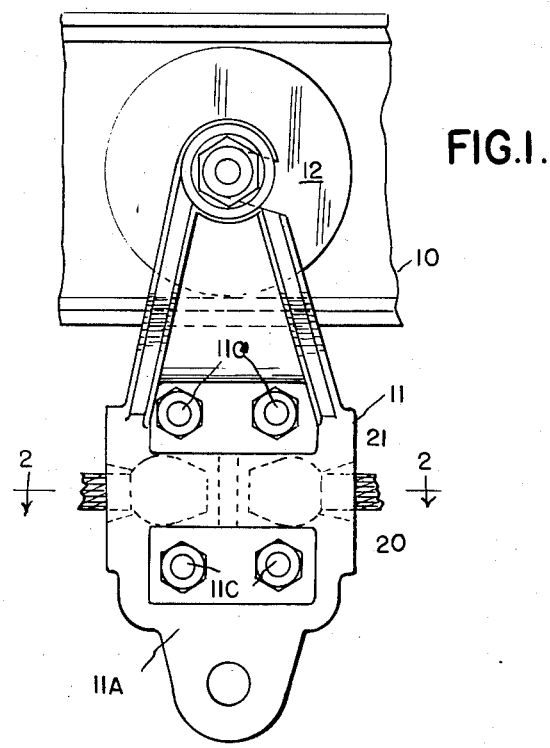
FIG.I.
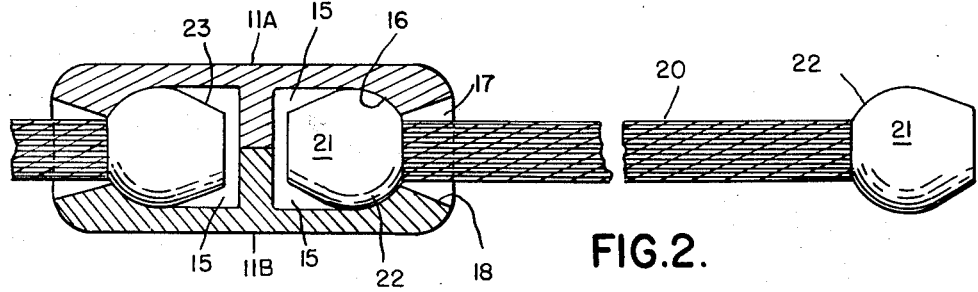
FIG.2.
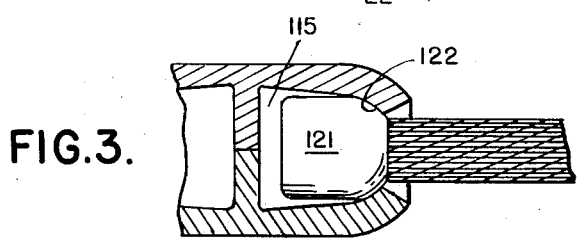
FIG.3.
*INVENTOR.*
DONALD D. ZEBLEY
ATTORNEYS

United States Patent Office 2,855,090
Patented Oct. 7, 1958

2,855,090

CABLE LINKED TRAVELLING CONVEYORS

Donald D. Zebley, Detroit, Mich.

Application May 25, 1953, Serial No. 357,115

1 Claim. (Cl. 198—177)

The present invention relates to travelling conveyors and specifically to such conveyors in which the load supporting trolley brackets are connected by means of short lengths of cable.

In conveyors of the type mentioned, as heretofore used, the short connecting lengths of cable or cable links have provided with substantially cylindrical heads or buttons presenting an abrupt shoulder, the plane of which is normal to the axis of the cable.

In such conveyors, changes in direction of movement such as around corners or passing into and out of dips or elevations, will cause the cable to bend at the point of entry of the cable into the bracket.

Among the objects of the present invention is the elimination or substantial elimination of this bending and provide for confining the tension on the cable along its axis.

Other objects will readily occur to those skilled in the art upon reference to the following description and the accompanying drawings in which Fig. 1 is a side elevation of a trolley bracket and link embodying the present invention.

Fig. 2 is a section on line 2—2 of Fig. 1.

Fig. 3 is a section similar to Fig. 2 but showing a modification.

In the drawing, a conveyor track, usually consisting of an I-beam, is shown at 10, with a trolley load carrying bracket 11 supported upon the lower flanges by means of the wheels or rollers 12 (only one of which is shown). The bracket consists of two identical members 11A and 11B bolted together as by the four bolts 11C and each is provided with recesses 15 in its inner face, which, when the members are fixed together, form sockets open to the edges of the completed bracket. These recesses and the sockets provided thereby are so formed as to produce a hemispherical bearing surface or seat 16 around the opening 17 and the latter is conical, diverging outwardly as shown at 18.

The cable link used with the described bracket consists of a suitable length of cable 20 having fixed to each end a button or head 21, having a hemispherical shoulder 22 of such radius as to fit the bearing surface or seat 16 and the conical opening 17 will have its inner end of a radius slightly larger than that of the cable 20.

The outlet end of the button 21 may be tapered as shown at 23 in order to permit the angular movement of the button in the seat 16.

Alternately, the recess may be enlarged toward its inner end as indicated at 115 in Fig. 3 and the button 121 may be substantially cylindrical beyond its hemispherical portion 122. In other respects the structures are identical.

By so forming the bracket recesses and the buttons on the cable links, there is permitted a limited universal relative movement between the links and brackets, so that substantially all of the bending movement of the cable adjacent the brackets is eliminated.

Now having described the invention and the preferred embodiments thereof, what is claimed is as follows:

In a cable linked travelling conveyor, a cable link provided at its ends with buttons presenting a hemispherical bearing surface, said buttons being otherwise substantially cylindrical and trolley brackets each provided with a pair of axially aligned separate recesses receiving such buttons, said recesses being themselves provided with hemispherical bearing surfaces adapted to coact with the bearing surfaces of the buttons, said recesses being enlarged by having their walls diverging beyond the hemispherical bearing surfaces.

References Cited in the file of this patent

UNITED STATES PATENTS

| | | |
|---|---|---|
| 174,990 | Webber | Mar. 21, 1876 |
| 727,759 | Double et al. | May 12, 1903 |
| 1,403,553 | Horn | Jan. 17, 1922 |
| 1,679,414 | Elsey | Aug. 7, 1928 |
| 2,250,278 | Skoverski | July 22, 1941 |
| 2,461,031 | Brickman | Feb. 8, 1949 |
| 2,633,226 | Vogt | Mar. 31, 1953 |

FOREIGN PATENTS

| | | |
|---|---|---|
| 371,760 | Germany | Mar. 21, 1923 |
| 534,609 | France | Jan. 9, 1922 |
| 622,808 | Great Britain | May 6, 1949 |
| 696,869 | France | Oct. 10, 1930 |